(No Model.) 2 Sheets—Sheet 1.
A. ARMITAGE.
CAR COUPLING.
No. 340,473. Patented Apr. 20, 1886.
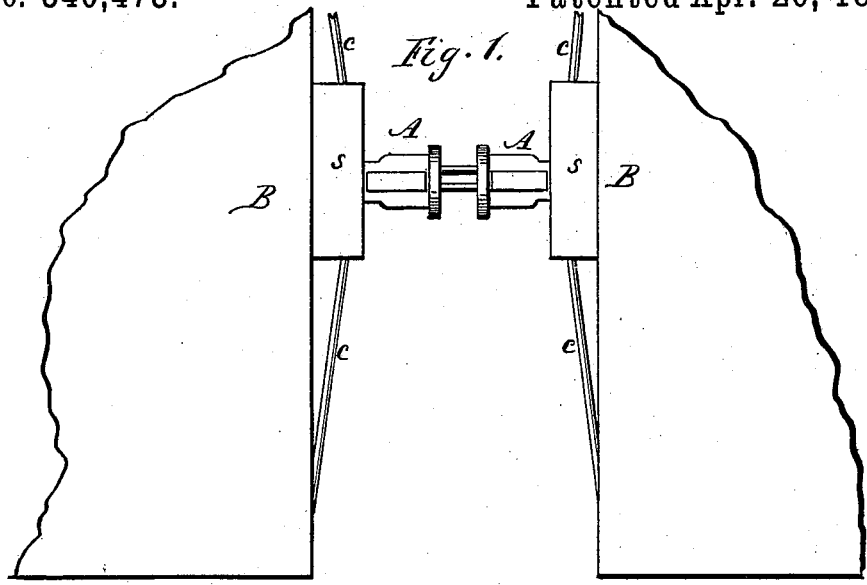
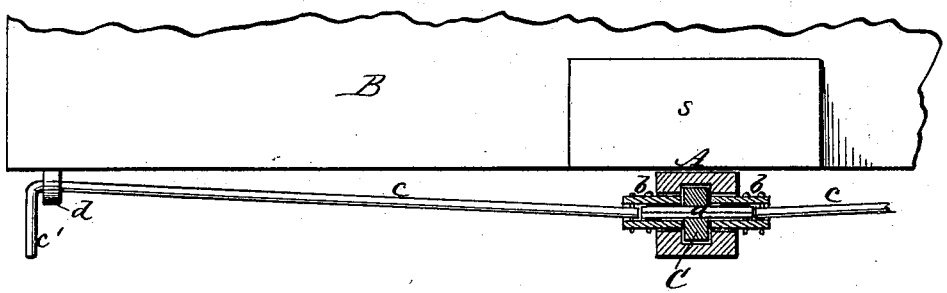
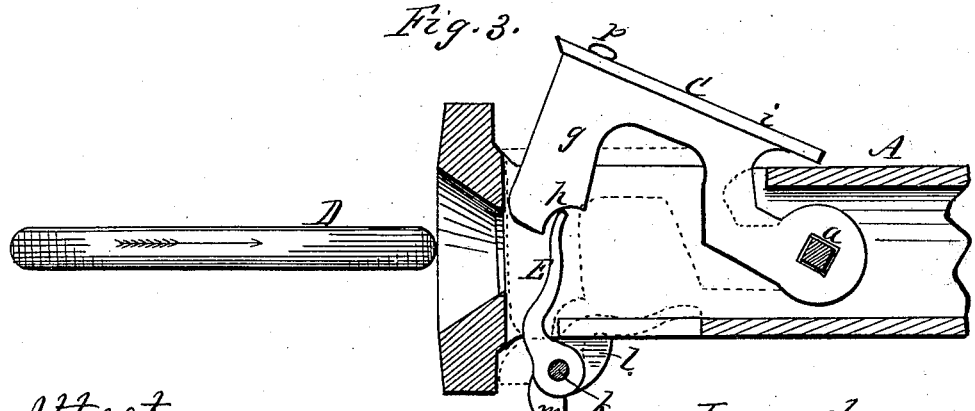
Attest.
E. N. Adams
E. E. Staring
Inventor.
Albert Armitage
pr R. L. Osgood,
Atty.

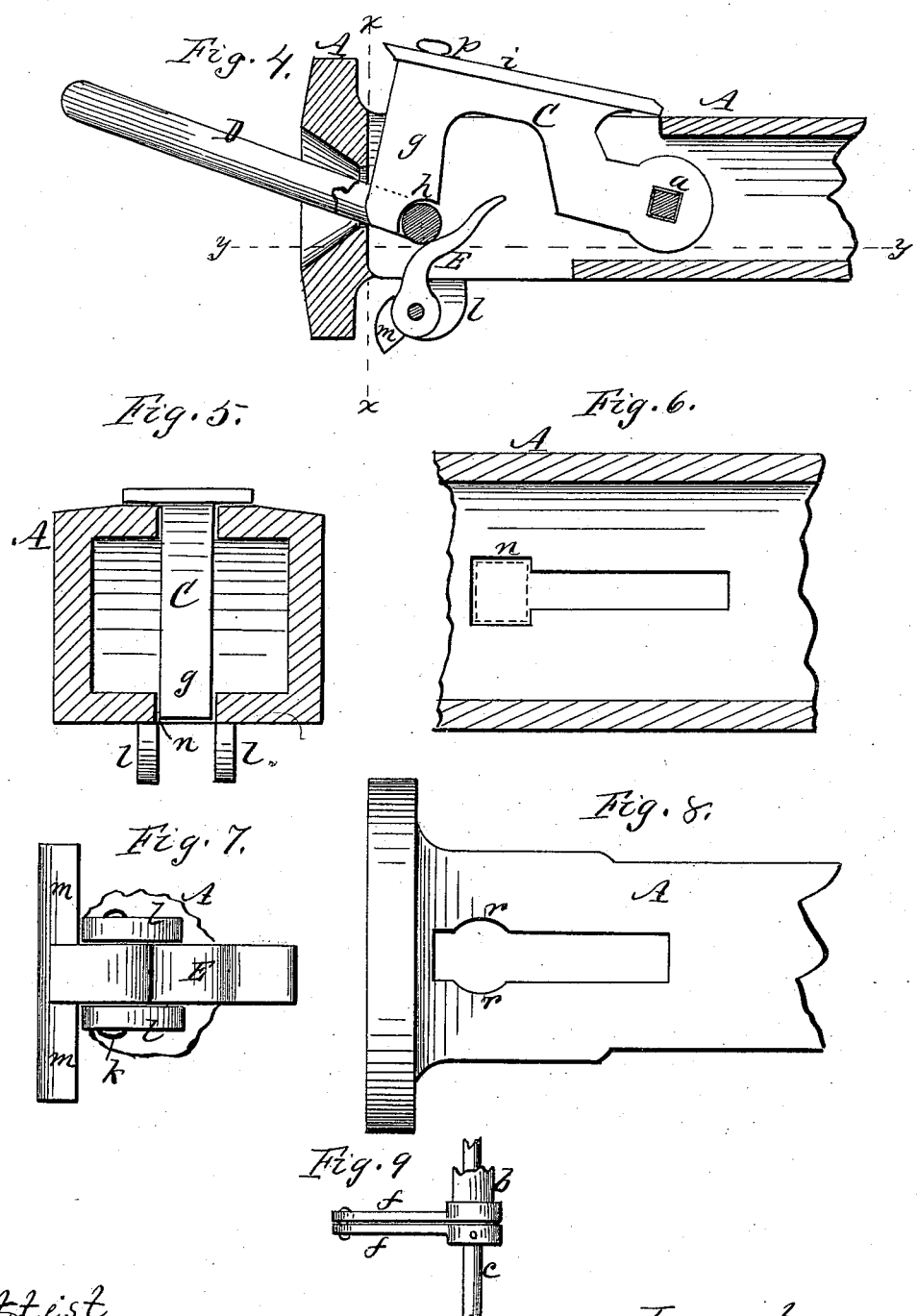

UNITED STATES PATENT OFFICE.

ALBERT ARMITAGE, OF LYONS, N. Y., ASSIGNOR OF TWO-THIRDS TO EDWARD F. GILBERT AND EDWARD F. KERSHNER, BOTH OF SAME PLACE.

CAR-COUPLING.

SPECIFICATION forming part of Letters Patent No. 340,473, dated April 20, 1886.

Application filed September 21, 1885. Serial No. 177,681. (No model.)

*To all whom it may concern:*

Be it known that I, ALBERT ARMITAGE, of Lyons, in the county of Wayne and State of New York, have invented a certain new and useful Improvement in Car-Couplings; and I do hereby declare that the following is a full, clear, and exact description of the same, reference being had to the drawings accompanying this application.

My improvement relates to that class of car-couplings in which a pivoted hook is used, with which engages an ordinary coupling-link.

The invention consists in the following construction and arrangement:

In the drawings, Figure 1 is a plan view showing the ends of two cars and the coupling connecting them. Fig. 2 is an elevation showing a portion of one end of a car, the draw-bar being in cross-section. Fig. 3 is an enlarged longitudinal section of one of the draw-heads, the hook being raised and set in position for the entrance of the link. Fig. 4 is a similar view showing the link set in an elevated position to engage with the coupling of a higher car. Fig. 5 is a cross-section of Fig. 4 in line *x x*. Fig. 6 is a longitudinal horizontal section in line *y y*. Fig. 7 is a plan view of the dog resting in its bearings. Fig. 8 is a plan of the draw-head, showing the hole for the entrance of the common coupling-pin. Fig. 9 is a plan view of cranks for operating the hook.

A A show the draw-heads of two cars, B B. C is a hook of peculiar construction in each of these draw-heads. The hook turns on a pivot, *a*, which in the drawings is shown as a square shaft, having circular sockets *b b* fitted thereon, and turning in cavities in the sides of the draw-bar. In the open square ends of the sockets are fitted rods *c c*, which extend outward nearly to the sides of the car, where they rest in bearings *d d*, and have crank ends *c' c'* turning downward. By turning these rods or either of them at the side of the car the hook can be elevated to any desired height without going between the cars. If desired, the form shown in Fig. 9 may be used, in which two cranks, *f f*, are employed, one attached to the socket that rests in the side of the draw-bar and turns the hook, the other attached to the rod *c*, and the two outer ends of the cranks being pivoted together. These cranks may fit flush in a cavity made in the side of the draw-bar, so as not to be exposed. The hook has a hook proper, *g*, in front, which, when in its lowest position, shuts down past the mouth of the draw-head and holds the coupling-link D in place. In the lower end of the hook, and on the rear or inner side, is formed a curved notch, *h*, the circle of which corresponds with that of the end of the link in cross-section, and it has a double purpose—first, to form a bearing for the dog when turned up, as will presently be described, and, second, to hold the link and allow it to be adjusted at any angle to engage with a higher or lower car, as will also be more fully explained. On top of the hook is a wide back, *i*, which fully covers the slot in which the hook plays, and therefore serves to keep out water, snow, dirt, and any extraneous substances.

E is a dog or latch, pivoted at *k* to two lugs, *l l*, on the under side of the draw-head and near the outer end. This dog is of the curved form shown, and it is of such form and length that when both the hook and the dog are elevated, as shown in Fig. 3, the end of the dog strikes into the curved notch *h* of the hook and holds it elevated. In this position the coupling is set for the entrance of the link attached to the next car.

In entering the mouth of the draw-head the link strikes the dog and springs the hook, which falls and engages the link, while the dog drops into the position shown in dotted lines, Fig. 3. On the knuckle of the dog is a counter-weight, *m m*, in the form of a cross-arm, which stands outside the curved bearings *l l* and swings around them as the dog turns. Being on the short end of the dog, the tendency of the counter-weight is to always throw the dog into the upright position. Therefore, when the hook is raised by the means before described, the dog always rises to lock it in place. When the hook is down, it stands across the mouth of the draw-head and opposes the entrance of the link. In this position the lower blunt end of the hook proper strikes into a square socket, *n*, Fig. 6, at the outer end of the slot in the bottom of the draw-head, which forms a shoulder to resist shock. On top of the hook is a loop or other attachment, p, by which the hook can be raised by hand when desired, or with which a chain or cord may be connected extending to the top of the car, which is a convenience in freight-cars.

Fig. 4 shows a link attached to the draw-head and in position for engaging with the draw-head of the next car. The inner end of the link is fitted in the curved notch h, its body resting on the lower edge of the mouth of the draw-head as a fulcrum. Then, by turning one of the rods c, thereby turning the hook, as before described, the link can be adjusted to stand at any height either above or below the horizontal. The operator, by guiding the link in this manner, can engage it with a coupling on the next car at any level. This is essential, as cars vary in height several inches. When the link is so fitted and held in the notch h, the weighted dog rises and fits the back of the link and remains in contact therewith at all times and at whatever adjustment the link may be set, and therefore the link will never slip from place.

r is a circular hole, made through the draw-head, in which the common coupling-pin can be inserted to engage the link should the hook get broken or injured. In such case the dog would have to be removed from place.

s is a block secured on the front of the bumper-beam in old cars or those already in use. In new cars, or those built with this coupling attached, such block is not required.

Having thus described my invention, what I claim as new, and desire to secure by Letters Patent, is—

1. In a car-coupling, the combination of the hook C, provided with a curved notch, h, in its lower end, and the dog E, provided with a counter-weight at its outer end, the dog rising and entering the notch when the hook is elevated and supporting the same, as set forth.

2. In a car-coupling, the combination of the hook C, provided with a curved notch, h, in its lower end corresponding with the circle of the link in cross-section, and the dog E, provided with a counter-weight at the outer end, the notch serving to hold the link in place to engage with the coupling on the next car, and the dog resting in contact with the link at any adjustment of the latter, as set forth.

In witness whereof I have hereunto signed my name in the presence of two subscribing witnesses.

ALBERT ARMITAGE.

Witnesses:
GEORGE KENT,
PARDON DURFEE.